US009522677B2

United States Patent
Lavoie

(10) Patent No.: US 9,522,677 B2
(45) Date of Patent: Dec. 20, 2016

(54) MITIGATION OF INPUT DEVICE FAILURE AND MODE MANAGEMENT

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/562,101

(22) Filed: Dec. 5, 2014

(65) Prior Publication Data

US 2016/0159348 A1    Jun. 9, 2016

(51) Int. Cl.
| | |
|---|---|
| *B62D 1/00* | (2006.01) |
| *B62D 5/00* | (2006.01) |
| *B62D 6/00* | (2006.01) |
| *B60W 30/10* | (2006.01) |
| *B60W 10/18* | (2012.01) |
| *B60W 10/20* | (2006.01) |
| *B60W 50/02* | (2012.01) |

(52) U.S. Cl.
CPC .............. *B60W 30/10* (2013.01); *B60W 10/18* (2013.01); *B60W 10/20* (2013.01); *B60W 50/0205* (2013.01); *B60W 2300/14* (2013.01); *B60W 2520/22* (2013.01); *B60W 2540/12* (2013.01); *B60W 2540/18* (2013.01); *B60W 2710/18* (2013.01); *B60W 2710/20* (2013.01); *B60W 2720/22* (2013.01)

(58) Field of Classification Search
CPC combination set(s) only.
See application file for complete search history.

(56) References Cited

U.S. PATENT DOCUMENTS

| | | | |
|---|---|---|---|
| 3,605,088 | A | 9/1971 | Savelli |
| 3,833,928 | A | 9/1974 | Gavit et al. |

(Continued)

FOREIGN PATENT DOCUMENTS

| | | | |
|---|---|---|---|
| CN | 101610420 | A | 12/2009 |
| CN | 101833869 | A | 9/2010 |

(Continued)

OTHER PUBLICATIONS

Jae IL Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.

(Continued)

*Primary Examiner* — Yonel Beaulieu
(74) *Attorney, Agent, or Firm* — Raymond Coppiellie; Price Heneveld LLP

(57) ABSTRACT

A trailer backup assist system includes a sensor that senses a hitch angle between a vehicle and a trailer. The trailer backup assist system also includes a steering input device that provides a backing path of the trailer. Further, the trailer backup assist system includes a controller that generates a steering command for the vehicle based on the hitch angle and the backing path. The controller generates a countermeasure for operating the vehicle when the steering input device fails to provide the desired backing path fails or the controller otherwise fails to sense the input signal from the steering input device.

20 Claims, 7 Drawing Sheets

(56) References Cited

U.S. PATENT DOCUMENTS

| | | | |
|---|---|---|---|
| 3,924,257 A | 12/1975 | Roberts | |
| 3,944,972 A | 3/1976 | Chandler | |
| 4,044,706 A | 8/1977 | Gill | |
| 4,430,637 A | 2/1984 | Koch-Ducker et al. | |
| 4,518,044 A | 5/1985 | Wiegardt et al. | |
| 4,846,094 A | 7/1989 | Woods | |
| 4,848,499 A | 7/1989 | Martinet et al. | |
| 4,897,642 A | 1/1990 | DiLullo et al. | |
| 4,947,097 A | 8/1990 | Tao | |
| 5,097,250 A | 3/1992 | Hernandez | |
| 5,132,851 A * | 7/1992 | Bomar | G01S 15/88 359/843 |
| 5,155,683 A | 10/1992 | Rahim | |
| 5,191,328 A | 3/1993 | Nelson | |
| 5,235,316 A | 8/1993 | Qualizza | |
| 5,247,442 A | 9/1993 | Kendall | |
| 5,261,495 A | 11/1993 | Szymczak | |
| 5,270,689 A | 12/1993 | Hermann | |
| 5,313,389 A | 5/1994 | Yasui | |
| 5,455,557 A | 10/1995 | Noll et al. | |
| 5,461,357 A | 10/1995 | Yoshioka et al. | |
| 5,650,764 A | 7/1997 | McCullough | |
| 5,690,347 A | 11/1997 | Juergens et al. | |
| 5,734,336 A | 3/1998 | Smithline | |
| 5,781,662 A | 7/1998 | Mori et al. | |
| 5,905,433 A | 5/1999 | Wortham | |
| 5,951,035 A | 9/1999 | Phillips, Jr. et al. | |
| 5,957,232 A | 9/1999 | Shimizu et al. | |
| 5,999,091 A | 12/1999 | Wortham | |
| 6,041,582 A | 3/2000 | Tiede et al. | |
| 6,100,795 A | 8/2000 | Otterbacher et al. | |
| 6,178,650 B1 | 1/2001 | Thibodeaux | |
| 6,182,010 B1 | 1/2001 | Berstis | |
| 6,198,992 B1 | 3/2001 | Winslow | |
| 6,226,226 B1 | 5/2001 | Lill et al. | |
| 6,351,698 B1 | 2/2002 | Kubota et al. | |
| 6,366,202 B1 | 4/2002 | Rosenthal | |
| 6,411,898 B2 | 6/2002 | Ishida et al. | |
| 6,434,486 B1 | 8/2002 | Studt et al. | |
| 6,480,104 B1 | 11/2002 | Wall et al. | |
| 6,483,429 B1 | 11/2002 | Yasui et al. | |
| 6,526,335 B1 | 2/2003 | Treyz et al. | |
| 6,539,288 B2 | 3/2003 | Ishida et al. | |
| 6,573,833 B1 | 6/2003 | Rosenthal | |
| 6,577,952 B2 | 6/2003 | Geier et al. | |
| 6,580,984 B2 | 6/2003 | Fecher et al. | |
| 6,604,592 B2 | 8/2003 | Pietsch et al. | |
| 6,636,197 B1 | 10/2003 | Goldenberg et al. | |
| 6,643,576 B1 | 11/2003 | O Connor et al. | |
| 6,683,539 B2 | 1/2004 | Trajkovic et al. | |
| 6,801,125 B1 | 10/2004 | McGregor et al. | |
| 6,816,765 B2 | 11/2004 | Yamamoto et al. | |
| 6,837,432 B2 | 1/2005 | Tsikos et al. | |
| 6,847,916 B1 | 1/2005 | Ying | |
| 6,857,494 B2 | 2/2005 | Kobayashi et al. | |
| 6,933,837 B2 | 8/2005 | Gunderson et al. | |
| 6,959,970 B2 | 11/2005 | Tseng | |
| 6,970,184 B2 | 11/2005 | Hirama et al. | |
| 6,989,739 B2 | 1/2006 | Li | |
| 7,005,974 B2 | 2/2006 | McMahon et al. | |
| 7,026,957 B2 | 4/2006 | Rubenstein | |
| 7,038,667 B1 | 5/2006 | Vassallo et al. | |
| 7,047,117 B2 | 5/2006 | Akiyama et al. | |
| 7,085,634 B2 | 8/2006 | Endo et al. | |
| 7,089,101 B2 | 8/2006 | Fischer et al. | |
| 7,136,754 B2 | 11/2006 | Hahn et al. | |
| 7,142,098 B2 | 11/2006 | Lang et al. | |
| 7,154,385 B2 | 12/2006 | Lee et al. | |
| 7,161,616 B1 | 1/2007 | Okamoto et al. | |
| 7,175,194 B2 | 2/2007 | Ball | |
| 7,191,865 B2 | 3/2007 | Spark | |
| 7,204,504 B2 | 4/2007 | Gehring et al. | |
| 7,207,041 B2 | 4/2007 | Elson et al. | |
| 7,220,217 B2 | 5/2007 | Tamai et al. | |
| 7,225,891 B2 | 6/2007 | Gehring et al. | |
| 7,229,139 B2 | 6/2007 | Lu et al. | |
| 7,239,958 B2 | 7/2007 | Grougan et al. | |
| 7,255,061 B2 | 8/2007 | Denton | |
| 7,266,435 B2 | 9/2007 | Wang et al. | |
| 7,309,075 B2 | 12/2007 | Ramsey et al. | |
| 7,310,084 B2 | 12/2007 | Shitanaka et al. | |
| 7,315,299 B2 | 1/2008 | Sunda et al. | |
| 7,319,927 B1 | 1/2008 | Sun et al. | |
| 7,352,388 B2 | 4/2008 | Miwa et al. | |
| 7,353,110 B2 | 4/2008 | Kim | |
| 7,366,892 B2 | 4/2008 | Spaur et al. | |
| 7,401,871 B2 | 7/2008 | Lu et al. | |
| 7,425,889 B2 | 9/2008 | Widmann et al. | |
| 7,436,398 B2 | 10/2008 | Yuasa et al. | |
| 7,451,020 B2 | 11/2008 | Goetting et al. | |
| 7,463,137 B2 | 12/2008 | Wishart et al. | |
| 7,505,784 B2 | 3/2009 | Barbera | |
| 7,537,256 B2 | 5/2009 | Gates et al. | |
| 7,550,686 B2 | 6/2009 | Girke et al. | |
| 7,552,009 B2 | 6/2009 | Nelson | |
| 7,602,782 B2 | 10/2009 | Doviak et al. | |
| 7,623,952 B2 | 11/2009 | Unruh et al. | |
| 7,640,108 B2 | 12/2009 | Shimizu et al. | |
| 7,689,253 B2 | 3/2010 | Basir | |
| 7,690,737 B2 | 4/2010 | Lu | |
| 7,692,557 B2 | 4/2010 | Medina et al. | |
| 7,693,661 B2 | 4/2010 | Iwasaka | |
| 7,715,953 B2 | 5/2010 | Shepard | |
| 7,777,615 B2 | 8/2010 | Okuda et al. | |
| 7,783,699 B2 | 8/2010 | Rasin et al. | |
| 7,786,849 B2 | 8/2010 | Buckley | |
| 7,801,941 B2 | 9/2010 | Conneely et al. | |
| 7,825,782 B2 | 11/2010 | Hermann | |
| 7,827,047 B2 | 11/2010 | Anderson et al. | |
| 7,827,917 B1 | 11/2010 | Henderson | |
| 7,837,004 B2 | 11/2010 | Yasuda | |
| 7,840,347 B2 | 11/2010 | Noguchi | |
| 7,904,222 B2 | 3/2011 | Lee et al. | |
| 7,907,975 B2 | 3/2011 | Sakamoto et al. | |
| 7,917,081 B2 | 3/2011 | Voto et al. | |
| 7,932,623 B2 | 4/2011 | Burlak et al. | |
| 7,932,815 B2 | 4/2011 | Martinez et al. | |
| 7,950,751 B2 | 5/2011 | Offerle et al. | |
| 7,969,326 B2 | 6/2011 | Sakakibara | |
| 7,974,444 B2 | 7/2011 | Hongo | |
| 8,009,025 B2 | 8/2011 | Engstrom et al. | |
| 8,010,252 B2 | 8/2011 | Getman et al. | |
| 8,019,592 B2 | 9/2011 | Fukuoka et al. | |
| 8,024,743 B2 | 9/2011 | Werner | |
| 8,033,955 B2 | 10/2011 | Farnsworth | |
| 8,036,792 B2 | 10/2011 | Dechamp | |
| 8,037,500 B2 | 10/2011 | Margis et al. | |
| 8,038,166 B1 | 10/2011 | Piesinger | |
| 8,044,776 B2 | 10/2011 | Schofield et al. | |
| 8,044,779 B2 | 10/2011 | Hahn et al. | |
| 8,121,802 B2 | 2/2012 | Grider et al. | |
| 8,131,458 B1 | 3/2012 | Zilka | |
| 8,138,865 B2 | 3/2012 | North et al. | |
| 8,140,138 B2 | 3/2012 | Chrumka | |
| 8,150,474 B2 | 4/2012 | Saito et al. | |
| 8,165,770 B2 | 4/2012 | Getman et al. | |
| 8,169,341 B2 | 5/2012 | Toledo et al. | |
| 8,174,576 B2 | 5/2012 | Akatsuka et al. | |
| 8,179,238 B2 | 5/2012 | Roberts, Sr. et al. | |
| 8,195,145 B2 | 6/2012 | Angelhag | |
| 8,205,704 B2 | 6/2012 | Kadowaki et al. | |
| 8,244,442 B2 | 8/2012 | Craig et al. | |
| 8,245,270 B2 | 8/2012 | Cooperstein et al. | |
| 8,255,007 B2 | 8/2012 | Saito et al. | |
| 8,267,485 B2 | 9/2012 | Barlsen et al. | |
| 8,270,933 B2 | 9/2012 | Riemer et al. | |
| 8,280,607 B2 | 10/2012 | Gatti et al. | |
| 8,308,182 B2 | 11/2012 | Ortmann et al. | |
| 8,310,353 B2 | 11/2012 | Hinninger et al. | |
| 8,315,617 B2 | 11/2012 | Tadayon et al. | |
| 8,319,618 B2 | 11/2012 | Gomi et al. | |
| 8,319,663 B2 | 11/2012 | Von Reyher et al. | |
| 8,352,575 B2 | 1/2013 | Samaha | |
| 8,362,888 B2 | 1/2013 | Roberts, Sr. et al. | |

(56) References Cited

U.S. PATENT DOCUMENTS

| | | |
|---|---|---|
| 8,370,056 B2 | 2/2013 | Trombley et al. |
| 8,374,749 B2 | 2/2013 | Tanaka |
| 8,380,416 B2 | 2/2013 | Offerle et al. |
| 8,392,066 B2 | 3/2013 | Ehara et al. |
| 8,401,744 B2 | 3/2013 | Chiocco |
| 8,406,956 B2 | 3/2013 | Wey et al. |
| 8,417,263 B2 | 4/2013 | Jenkins et al. |
| 8,417,417 B2 | 4/2013 | Chen et al. |
| 8,417,444 B2 | 4/2013 | Smid et al. |
| 8,427,288 B2 | 4/2013 | Schofield et al. |
| 8,451,107 B2 | 5/2013 | Lu et al. |
| 8,471,691 B2 | 6/2013 | Zhang et al. |
| 8,473,575 B2 | 6/2013 | Marchwicki et al. |
| 8,494,439 B2 | 7/2013 | Faenger |
| 8,498,757 B2 | 7/2013 | Bowden et al. |
| 8,519,948 B2 | 8/2013 | Cruz-Hernandez et al. |
| 8,538,785 B2 | 9/2013 | Coleman et al. |
| 8,548,680 B2 | 10/2013 | Ryerson et al. |
| 8,560,175 B2 | 10/2013 | Bammert et al. |
| 8,571,758 B2 | 10/2013 | Klier et al. |
| 8,626,382 B2 | 1/2014 | Obradovich |
| 8,755,984 B2 | 6/2014 | Rupp et al. |
| 8,786,417 B2 | 7/2014 | Holmen et al. |
| 8,788,204 B2 | 7/2014 | Shimizu |
| 8,797,190 B2 | 8/2014 | Kolbe et al. |
| 8,798,860 B2 | 8/2014 | Dechamp |
| 8,807,261 B2 | 8/2014 | Subrt et al. |
| 8,823,796 B2 | 9/2014 | Shen et al. |
| 8,868,329 B2 | 10/2014 | Ikeda et al. |
| 8,888,120 B2 | 11/2014 | Trevino |
| 8,892,360 B2 | 11/2014 | Otani |
| 8,909,426 B2 | 12/2014 | Rhode et al. |
| 8,928,757 B2 | 1/2015 | Maekawa et al. |
| 8,930,140 B2 * | 1/2015 | Trombley ............... G01C 21/20 348/148 |
| 9,008,913 B1 | 4/2015 | Sears et al. |
| 9,013,286 B2 | 4/2015 | Chen et al. |
| 9,042,603 B2 | 5/2015 | Elwart et al. |
| 9,082,315 B2 | 7/2015 | Lin et al. |
| 9,094,583 B2 | 7/2015 | Shih et al. |
| 9,102,271 B2 | 8/2015 | Trombley et al. |
| 9,108,598 B2 | 8/2015 | Headley |
| 9,114,832 B2 | 8/2015 | Wang et al. |
| 9,120,359 B2 | 9/2015 | Chiu et al. |
| 9,132,856 B2 | 9/2015 | Shepard |
| 9,208,686 B2 | 12/2015 | Takamatsu |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 2002/0005780 A1 | 1/2002 | Ehrlich et al. |
| 2002/0098853 A1 | 7/2002 | Chrumka |
| 2002/0111118 A1 | 8/2002 | Klitsner et al. |
| 2003/0079123 A1 | 4/2003 | Mas Ribes |
| 2003/0147534 A1 | 8/2003 | Ablay et al. |
| 2003/0222982 A1 | 12/2003 | Hamdan et al. |
| 2003/0234512 A1 | 12/2003 | Holub |
| 2004/0093139 A1 | 5/2004 | Wildey et al. |
| 2004/0119822 A1 | 6/2004 | Custer et al. |
| 2004/0189595 A1 | 9/2004 | Yuasa et al. |
| 2004/0203660 A1 | 10/2004 | Tibrewal et al. |
| 2004/0207525 A1 | 10/2004 | Wholey et al. |
| 2004/0260438 A1 | 12/2004 | Chernetsky et al. |
| 2005/0000738 A1 | 1/2005 | Gehring et al. |
| 2005/0073433 A1 | 4/2005 | Gunderson et al. |
| 2005/0074143 A1 | 4/2005 | Kawai |
| 2005/0091408 A1 | 4/2005 | Parupudi et al. |
| 2005/0128059 A1 | 6/2005 | Vause |
| 2005/0146607 A1 | 7/2005 | Linn et al. |
| 2005/0168331 A1 | 8/2005 | Gunderson |
| 2005/0177635 A1 | 8/2005 | Schmidt et al. |
| 2005/0206225 A1 | 9/2005 | Offerle et al. |
| 2005/0206231 A1 | 9/2005 | Lu et al. |
| 2005/0206299 A1 | 9/2005 | Nakamura et al. |
| 2005/0236201 A1 | 10/2005 | Spannheimer et al. |
| 2005/0236896 A1 | 10/2005 | Offerle et al. |
| 2006/0071447 A1 | 4/2006 | Gehring et al. |
| 2006/0076828 A1 | 4/2006 | Lu et al. |
| 2006/0092129 A1 | 5/2006 | Choquet et al. |
| 2006/0103511 A1 | 5/2006 | Lee et al. |
| 2006/0111820 A1 | 5/2006 | Goetting et al. |
| 2006/0142936 A1* | 6/2006 | Dix ..................... A01B 79/005 701/50 |
| 2006/0156315 A1 | 7/2006 | Wood et al. |
| 2006/0190097 A1 | 8/2006 | Rubenstein |
| 2006/0238538 A1 | 10/2006 | Kapler et al. |
| 2006/0244579 A1 | 11/2006 | Raab |
| 2006/0250501 A1 | 11/2006 | Widmann et al. |
| 2006/0276959 A1 | 12/2006 | Matsuoka et al. |
| 2006/0287821 A1 | 12/2006 | Lin |
| 2006/0293800 A1 | 12/2006 | Bauer et al. |
| 2007/0027581 A1 | 2/2007 | Bauer et al. |
| 2007/0057816 A1 | 3/2007 | Sakakibara et al. |
| 2007/0132560 A1 | 6/2007 | Nystrom et al. |
| 2007/0132573 A1 | 6/2007 | Quach et al. |
| 2007/0198190 A1 | 8/2007 | Bauer et al. |
| 2007/0216136 A1 | 9/2007 | Dietz |
| 2007/0260395 A1 | 11/2007 | Matsuoka et al. |
| 2008/0027599 A1 | 1/2008 | Logan et al. |
| 2008/0027635 A1 | 1/2008 | Tengler et al. |
| 2008/0030361 A1 | 2/2008 | Peissner et al. |
| 2008/0148374 A1 | 6/2008 | Spaur et al. |
| 2008/0177443 A1 | 7/2008 | Lee et al. |
| 2008/0180526 A1 | 7/2008 | Trevino |
| 2008/0186384 A1 | 8/2008 | Ishii et al. |
| 2008/0231701 A1 | 9/2008 | Greenwood et al. |
| 2008/0312792 A1 | 12/2008 | Dechamp |
| 2008/0313050 A1 | 12/2008 | Basir |
| 2009/0005932 A1 | 1/2009 | Lee et al. |
| 2009/0045924 A1 | 2/2009 | Roberts, Sr. et al. |
| 2009/0063053 A1 | 3/2009 | Basson et al. |
| 2009/0075624 A1 | 3/2009 | Cox et al. |
| 2009/0079828 A1 | 3/2009 | Lee et al. |
| 2009/0082935 A1 | 3/2009 | Leschuk et al. |
| 2009/0093928 A1 | 4/2009 | Getman et al. |
| 2009/0101429 A1 | 4/2009 | Williams |
| 2009/0106036 A1 | 4/2009 | Tamura et al. |
| 2009/0117890 A1 | 5/2009 | Jacobsen et al. |
| 2009/0140064 A1 | 6/2009 | Schultz et al. |
| 2009/0219147 A1 | 9/2009 | Bradley et al. |
| 2009/0253466 A1 | 10/2009 | Saito et al. |
| 2009/0271078 A1 | 10/2009 | Dickinson |
| 2009/0306854 A1 | 12/2009 | Dechamp |
| 2009/0318119 A1 | 12/2009 | Basir et al. |
| 2010/0060739 A1 | 3/2010 | Salazar |
| 2010/0063670 A1 | 3/2010 | Brzezinski et al. |
| 2010/0098853 A1 | 4/2010 | Hoffmann et al. |
| 2010/0114471 A1 | 5/2010 | Sugiyama et al. |
| 2010/0152989 A1 | 6/2010 | Smith et al. |
| 2010/0156671 A1 | 6/2010 | Lee et al. |
| 2010/0157061 A1 | 6/2010 | Katsman et al. |
| 2010/0171828 A1 | 7/2010 | Ishii |
| 2010/0174422 A1 | 7/2010 | Jacobsen et al. |
| 2010/0191421 A1 | 7/2010 | Nilsson |
| 2010/0198491 A1 | 8/2010 | Mays |
| 2010/0222964 A1 | 9/2010 | Dechamp |
| 2010/0234071 A1 | 9/2010 | Shabtay et al. |
| 2010/0305815 A1 | 12/2010 | Trueman et al. |
| 2010/0306309 A1 | 12/2010 | Santori et al. |
| 2010/0324770 A1 | 12/2010 | Ramsey et al. |
| 2011/0022282 A1 | 1/2011 | Wu et al. |
| 2011/0025482 A1 | 2/2011 | Alguera et al. |
| 2011/0063425 A1 | 3/2011 | Tieman |
| 2011/0088659 A1 | 4/2011 | Wang et al. |
| 2011/0102583 A1 | 5/2011 | Kinzalow |
| 2011/0110530 A1 | 5/2011 | Kimura |
| 2011/0112721 A1 | 5/2011 | Wang et al. |
| 2011/0112762 A1 | 5/2011 | Gruijters et al. |
| 2011/0125457 A1 | 5/2011 | Lee et al. |
| 2011/0129093 A1 | 6/2011 | Karam et al. |
| 2011/0140872 A1 | 6/2011 | McClure |
| 2011/0149077 A1 | 6/2011 | Robert |
| 2011/0153198 A1 | 6/2011 | Kokkas et al. |
| 2011/0160956 A1 | 6/2011 | Chung et al. |

(56) References Cited

U.S. PATENT DOCUMENTS

| | | |
|---|---|---|
| 2011/0181457 A1 | 7/2011 | Basten |
| 2011/0185390 A1 | 7/2011 | Faenger et al. |
| 2011/0195659 A1 | 8/2011 | Boll et al. |
| 2011/0216199 A1 | 9/2011 | Trevino et al. |
| 2011/0257860 A1 | 10/2011 | Getman et al. |
| 2011/0281522 A1 | 11/2011 | Suda |
| 2011/0296037 A1 | 12/2011 | Westra et al. |
| 2012/0004805 A1 | 1/2012 | Gray et al. |
| 2012/0030626 A1 | 2/2012 | Hopkins et al. |
| 2012/0062743 A1 | 3/2012 | Lynam et al. |
| 2012/0062744 A1 | 3/2012 | Schofield et al. |
| 2012/0065815 A1 | 3/2012 | Hess |
| 2012/0079002 A1 | 3/2012 | Boll et al. |
| 2012/0084292 A1 | 4/2012 | Liang et al. |
| 2012/0086808 A1 | 4/2012 | Lynam et al. |
| 2012/0087480 A1 | 4/2012 | Yang et al. |
| 2012/0095649 A1 | 4/2012 | Klier et al. |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0224059 A1 | 9/2012 | Takamatsu |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0288156 A1 | 11/2012 | Kido |
| 2012/0290150 A1 | 11/2012 | Doughty et al. |
| 2012/0314073 A1 | 12/2012 | Shimoda et al. |
| 2012/0316732 A1 | 12/2012 | Auer |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0038436 A1 | 2/2013 | Brey et al. |
| 2013/0041524 A1 | 2/2013 | Brey |
| 2013/0057397 A1 | 3/2013 | Cutler et al. |
| 2013/0076007 A1 | 3/2013 | Goode et al. |
| 2013/0148748 A1 | 6/2013 | Suda |
| 2013/0158803 A1 | 6/2013 | Headley |
| 2013/0158863 A1 | 6/2013 | Skvarce et al. |
| 2013/0226390 A1 | 8/2013 | Luo et al. |
| 2013/0250114 A1 | 9/2013 | Lu |
| 2013/0253814 A1 | 9/2013 | Wirthlin |
| 2013/0268160 A1 | 10/2013 | Trombley et al. |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0074743 A1 | 3/2014 | Rademaker |
| 2014/0085472 A1 | 3/2014 | Lu et al. |
| 2014/0088797 A1 | 3/2014 | McClain et al. |
| 2014/0088824 A1 | 3/2014 | Ishimoto |
| 2014/0121883 A1 | 5/2014 | Shen et al. |
| 2014/0121930 A1 | 5/2014 | Allexi et al. |
| 2014/0156148 A1 | 6/2014 | Kikuchi |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0267727 A1 | 9/2014 | Alaniz |
| 2014/0267868 A1 | 9/2014 | Mazzola et al. |
| 2014/0267869 A1 | 9/2014 | Sawa |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0361955 A1 | 12/2014 | Goncalves |
| 2014/0379217 A1 | 12/2014 | Rupp et al. |
| 2015/0002670 A1 | 1/2015 | Bajpai |
| 2015/0057903 A1 | 2/2015 | Rhode et al. |
| 2015/0066296 A1 | 3/2015 | Trombley et al. |
| 2015/0070161 A1 | 3/2015 | Mizumo et al. |
| 2015/0094945 A1 | 4/2015 | Cheng et al. |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0142211 A1 | 5/2015 | Shehata et al. |
| 2015/0158527 A1 | 6/2015 | Hafner et al. |
| 2015/0165850 A1 | 6/2015 | Chiu et al. |
| 2015/0179075 A1 | 6/2015 | Lee |
| 2015/0197278 A1 | 7/2015 | Boos et al. |
| 2015/0203156 A1 | 7/2015 | Hafner et al. |
| 2015/0210317 A1 | 7/2015 | Hafner et al. |
| 2015/0217692 A1 | 8/2015 | Yanagawa |
| 2015/0217693 A1 | 8/2015 | Pliefke et al. |
| 2015/0232031 A1 | 8/2015 | Kitaura et al. |
| 2015/0232092 A1 | 8/2015 | Fairgrieve et al. |
| 2015/0234386 A1 | 8/2015 | Zini et al. |
| 2016/0152263 A1 | 6/2016 | Singh et al. |

FOREIGN PATENT DOCUMENTS

| | | |
|---|---|---|
| CN | 202541524 U | 11/2012 |
| DE | 3923676 A1 | 1/1991 |
| DE | 3931518 A1 | 4/1991 |
| DE | 9208595 U1 | 8/1992 |
| DE | 10065230 A1 | 7/2002 |
| DE | 10154612 A1 | 5/2003 |
| DE | 102005043467 A1 | 3/2007 |
| DE | 102005043468 A1 | 3/2007 |
| DE | 102006002294 A1 | 7/2007 |
| DE | 102006035021 | 1/2008 |
| DE | 102006048947 A1 | 4/2008 |
| DE | 102008020838 A1 | 11/2008 |
| DE | 102008004160 A1 | 8/2009 |
| DE | 102009012253 A1 | 9/2010 |
| DE | 102010004920 A1 | 7/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102011108440 A1 | 1/2013 |
| EP | 0418653 A1 | 3/1991 |
| EP | 0849144 A2 | 6/1998 |
| EP | 1361543 A2 | 11/2003 |
| EP | 1695888 A2 | 8/2006 |
| EP | 1593552 B1 | 3/2007 |
| EP | 1810913 A1 | 7/2007 |
| EP | 2168815 A1 | 3/2010 |
| EP | 2199188 A2 | 6/2010 |
| EP | 2388180 A2 | 11/2011 |
| EP | 2452549 A1 | 5/2012 |
| EP | 2551132 A1 | 1/2013 |
| EP | 2644477 A1 | 10/2013 |
| EP | 1569073 B1 | 9/2014 |
| EP | 2803944 A2 | 11/2014 |
| FR | 2515379 A1 | 10/1981 |
| FR | 2606717 A1 | 5/1988 |
| FR | 2716145 A1 | 8/1995 |
| FR | 2786456 A1 | 6/2000 |
| FR | 2980750 A1 | 4/2013 |
| GB | 2265587 A | 10/1993 |
| GB | 2342630 A | 4/2000 |

(56) References Cited

FOREIGN PATENT DOCUMENTS

| | | | |
|---|---|---|---|
| GB | 2398048 A | 8/2004 | |
| GB | 2398049 A | 8/2004 | |
| GB | 2398050 A | 8/2004 | |
| JP | 63-085568 | 6/1988 | |
| JP | 06-028598 A | 4/1994 | |
| JP | 2003045269 A | 2/2003 | |
| JP | 2003148938 A | 5/2003 | |
| JP | 2003175852 A | 6/2003 | |
| JP | 2004114879 A | 4/2004 | |
| JP | 3716722 B2 | 11/2005 | |
| JP | 2007186118 A | 7/2007 | |
| JP | 2008027138 A | 2/2008 | |
| JP | 2008123028 A | 5/2008 | |
| JP | 2009171122 A | 7/2009 | |
| JP | 2012166647 A | 9/2012 | |
| JP | 2014034289 A | 2/2014 | |
| KR | 20060012710 A | 2/2006 | |
| KR | 20060133750 A | 12/2006 | |
| KR | 20110114897 A | 10/2011 | |
| KR | 20140105199 A | 9/2014 | |
| TW | 200930010 A | 7/2009 | |
| WO | 8503263 A1 | 8/1985 | |
| WO | 0044605 A1 | 8/2000 | |
| WO | 2011117372 A1 | 9/2011 | |
| WO | 2014019730 A1 | 2/2014 | |
| WO | 2014037500 A1 | 3/2014 | |
| WO | 2014123575 A1 | 8/2014 | |
| WO | 2015074027 A1 | 5/2015 | |

OTHER PUBLICATIONS

"Ford Super Duty: Truck Technology", Brochure, www.media.ford.com, Sep. 2011, pp. 1-2.
"Ford Guide to Towing", Trailer Life, Magazine, 2012, pp. 1-38.
"Dodge Dart: The Hot Compact Car", Brochure, www.dart-mouth.com/enginerring-development.html, pp. 1-6; date unknown.
M. Wagner, D. Zoebel, and A. Meroth, "Adaptive Software and Systems Architecture for Driver Assistance Systems" International Journal of Machine Learning and Computing, Oct. 2011, vol. 1, No. 4, pp. 359-365.
Christian Lundquist, Wolfgang Reinelt, Olof Enqvist, "Back Driving Assistant for Passenger Cars with Trailer", SAE Int'l, ZF Lenksysteme Gmbh, Schwaebisch Gmuend, Germany, 2006, pp. 1-8.
"Understanding Tractor-Trailer Performance", Caterpillar, 2006, pp. 1-28.
Divelbiss, A.W.; Wen, J.T.; "Trajectory Tracking Control of a Car-Trailer System", IEEE, Control Systems Technology, Aug. 6, 2002, vol. 5, No. 3, ISSN: 1063-6536, pp. 269-278.
Stahn, R.; Heiserich, G.; Stopp, A., "Laser Scanner-Based Navigation for Commercial Vehicles", IEEE, Intelligent Vehicles Symposium, Jun. 2007, pp. 969-974, print ISBN: 1931-0587.
Widrow, B.; Lamego, M.M., "Neurointerfaces: Applications", IEEE, Adaptive Systems for Signal Processing, Communications, and Control Symposium, Oct. 2000, pp. 441-444.
Dieter Zoebel, David Polock, Philipp Wojke, "Steering Assistance for Backing Up Articulated Vehicles", Systemics, Cybernetics and Informatics, Universitaet Koblenz-Landau, Germany, vol. 1, No. 5, pp. 101-106; date unknown.
Stephen K. Young, Carol A. Eberhard, Philip J. Moffa, "Development of Performance Specifications for Collision Avoidance Systems for Lane Change, Merging and Backing", TRW Space and Electronics Group, Feb. 1995, pp. 1-31.
Ford Motor Company, "09 F-150", Brochure, www.fordvehicles.com, pp. 1-30; date unknown.
Michael Paine, "Heavy Vehicle Object Detection Systems", Vehicle Design and Research Pty Lmited for VicRoads, Jun. 2003, pp. 1-22.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

"2012 Edge—Trailer Towing Selector", Brochure, Preliminary 2012 RV & Trailer Towing Guide Information, pp. 1-3.
"Meritor Wabco Reverse Detection Module for Trailers with 12-Volt Constant Power Systems", Technical Bulletin, TP-02172, Revised Oct. 2004, pp. 1-8.
Simonoff, Adam J., "USH0001469 Remotely Piloted Vehicle Control and Interface System", Aug. 1, 1995, pp. 1-7.
"Range Rover Evoque's Surround Camera System"; MSN Douglas Newcomb Jun. 15, 2012, pp. 1-2.
"Electronic Trailer Steering", VSE, Advanced Steering & Suspension Solutions, Brochure, 2009, The Netherlands, pp. 1-28.
"WABCO Electronic Braking System—New Generation", Vehicle Control Systems—An American Standard Company, www.wabco-auto.com, 2004, pp. 1-8.
T. Wang, "Reverse-A-Matic-Wheel Direction Sensor System Operation and Installation Manual", Dec. 15, 2005, pp. 1-9.
"Wireless-Enabled Microphone, Speaker and User Interface for a Vehicle", The IP.com, Aug. 26, 2004, pp. 1-5, IP.com disclosure No. IPCOM000030782D.
"RFID Read/Write Module", Grand Idea Studio, 2013, pp. 1-3, website, http://www.grandideastudio.com/portfolio/rfid-read-write-module/.
Laszlo Palkovics, Pal Michelberger, Jozsef Bokor, Peter Gaspar, "Adaptive Identification for Heavy-Truck Stability Control", Vehicle Systems Dynamics Supplement, vol. 25, No. sup1, 1996, pp. 502-518.
"Convenience and Loadspace Features" Jaguar Land Rover Limited, 2012, pp. 1-15, http://www.landrover.com/us/en/lr/all-new-range-rover/explore/.
"Delphi Lane Departure Warning", Delphi Corporation, Troy, Michigan pp. 1-2; date unknown.
Micah Steele, R. Brent Gillespie, "Shared Control Between Human and Machine: Using a Haptic Steering Wheel to Aid in Land Vehicle Guidance", University of Michigan, pp. 1-5; date unknown.
"Electric Power Steering", Toyota Hybrid System Diagnosis-Course 072, Section 7, pp. 1-10; date unknown.
"Telematics Past, Present, and Future," Automotive Service Association, www.ASAshop.org, May 2008, 20 pgs.
"Fully Automatic Trailer Tow Hitch With LIN Bus," https://webista.bmw.com/webista/show?id=1860575499&lang=engb&print=1, pp. 1-5; date unknown.
Nüsser, Renè; Pelz, Rodolfo Mann, "Bluetooth-based Wireless Connectivity in an Automotive Environment", VTC, 2000, pp. 1935-1942.
Whitfield, Kermit, "A Hitchhiker's Guide to the Telematics Ecosystem", Automotive Design & Production, Oct. 1, 2003, 3 pgs.
Narasimhan, N.; Janssen, C.; Pearce, M.; Song, Y., "A Lightweight Remote Display Management Protocol for Mobile Devices", 2007, IEEE, pp. 711-715.
Microsoft, Navigation System, Sync Powered by Microsoft, Ford Motor Company, Jul. 2007, 164 pgs.
Microsoft, Supplemental Guide, Sync Powered by Microsoft, Ford Motor Company, Nov. 2007, 86 pgs.
Voelcker, J., "Top 10 Tech Cars: It's the Environment, Stupid", IEEE Spectrum, Apr. 2008, pp. 26-35.
Microsoft, Navigation System, Sync Powered by Microsoft, Ford Motor Company, Oct. 2008, 194 pgs.
Microsoft, Supplemental Guide, Sync Powered by Microsoft, Ford Motor Company, Oct. 2008, 83 pgs.
Chantry, Darryl, "Mapping Applications to the Cloud", Microsoft Corporation, Jan. 2009, 20 pgs.
Yarden, Raam; Surage Jr., Chris; Kim, Chong IL; Doboli, Alex; Voisan, Emil; Purcaru, Constantin, "Tuki: A Voice-Activated Information Browser", 2009, IEEE, pp. 1-5.
Gil-Castiñeira, Felipe; Chaves-Diéguez, David; González-Castaño, Francisco J., "Integration of Nomadic Devices with Automotive User Interfaces", IEEE Transactions on Consumer Electronics, Feb. 2009, vol. 55, Issue 1, pp. 34-41.
Microsoft, Navigation System, Sync Powered by Microsoft, Ford Motor Company, Jul. 2009, 196 pgs.
Microsoft, Supplemental Guide, Sync Powered by Microsoft, Ford Motor Company, Aug. 2009, 87 pgs.

(56) References Cited

OTHER PUBLICATIONS

Goodwin, Antuan, "Ford Unveils Open-Source Sync Developer Platform", The Car Tech Blog, Oct. 29, 2009, 5 pgs. [Retrieved from http://reviews.cnet.com/8301-13746_7-10385619-48.html on Feb. 15, 2011].

Lamberti, Ralf, "Full Circle: The Rise of Vehicle-Installed Telematics",Telematics Munich, Nov. 10, 2009, 12 pgs.

"Apple Files Patent Which Could Allow You to Control Your Computer Remotely Using iPhone", Dec. 18, 2009, 7 pgs [Retrieved from www.iphonehacks.com on Jun. 22, 2010].

Newmark, Zack, "Student develop in-car cloud computing apps; envision the future of in-car connectivity", May 4, 2010, 3 pgs [Retrieved from www.worldcarfans.com on Jun. 18, 2010].

"Service Discovery Protocol (SDP)", Palo Wireless Bluetooth Resource Center, 7 pgs [Retrieved from http://palowireless.com/infotooth/tutorial/sdp.asp on Aug. 3, 2010].

Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.

"MobileSafer makes it easy to keep connected and safe", ZoomSafer Inc., 2010, 5 pgs. [Retrieved from http://zoomsafer.com/products/mobilesafer on Dec. 28, 2010].

"PhonEnforcer FAQs", Turnoffthecellphone.com, 3 pgs. [Retrieved from http://turnoffthecellphone.com/faq.html on Dec. 28, 2010].

"How PhonEnforcer Works", Turnoffthecellphone.com, 2 pgs. [Retrieved from http://turnoffthecellphone.com/howitworks.htm on Dec. 28, 2010].

European Patent Office, European Search Report for Application No. EP11151623, Feb. 15, 2011, 7 pgs.

Wikipedia, "X Window System", Wikipedia, The Free Encyclopedia, date unknown, 19 pgs. [Retrieved from http://en.wikipedia.org/w/index.php?title=X_Window_System&oldid=639253038].

Jung-Hoon Hwang, Ronald C. Arkin, and Dong-Soo Kwon; "Mobile robots at your fingertip: Bezier curve on-line trajectory generation for supervisory control," IEEE/RSJ, International Conference on Intelligent Robots and Systems, Las Vegas, Nevada, Oct. 2003, 6 pages.

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

* cited by examiner

1

MITIGATION OF INPUT DEVICE FAILURE AND MODE MANAGEMENT

FIELD OF THE INVENTION

The disclosure made herein relates generally to trailer motion and parameter estimation, and more particularly to hitch angle estimation for a trailer using yaw signals to assist with vehicle guidance of the trailer, such as a trailer backup assist system.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer frequently estimate the position of the trailer relative to the vehicle with a sensor that determines a hitch angle. The accuracy and reliability of this hitch angle estimation can be critical to the operation of the backup assist system. It is also understood that reliable hitch angle estimation can be useful for additional vehicle features, such as monitoring for trailer sway.

SUMMARY OF THE INVENTION

According to one aspect of the present invention, a trailer backup assist system includes a sensor that senses a hitch angle between a vehicle and a trailer. The trailer backup assist system also includes a steering input device that provides a backing path of the trailer. Further, the trailer backup assist system includes a controller that generates a steering command for the vehicle based on the hitch angle and the backing path. The controller generates a countermeasure for operating the vehicle when the sensor fails to sense the hitch angle.

According to another aspect of the present invention, a sensor failure mitigation system for a trailer backup assist system includes a sensor that measures a hitch angle between a vehicle and a trailer. The system also includes a controller that detects failure of the sensor to measure the hitch angle and engages a countermeasure when the sensor fails. The controller disengages the countermeasure upon a driver intervention to operate the vehicle.

According to a further aspect of the present invention, a method for mitigating sensor failure of a trailer backup assist system includes sensing a hitch angle between a vehicle and a trailer. The method also generates a steering command for the vehicle based on the hitch angle. Further, the method generates a countermeasure command for the vehicle when the hitch angle fails to be sensed and disengages the countermeasure command upon a driver intervention.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
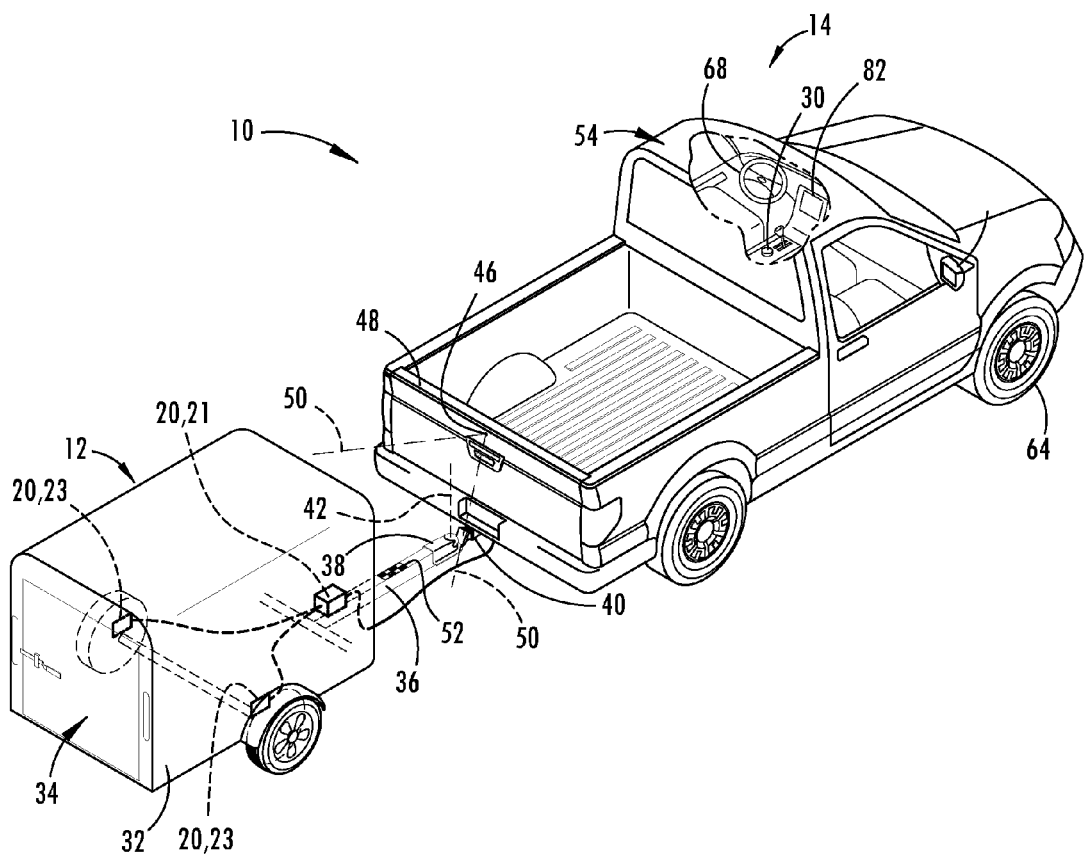
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-9, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\omega_2$. The trailer backup assist system 10, according to such an embodiment, may also include a vehicle sensor system 17 that generates a vehicle yaw rate $\omega_1$ and a vehicle speed $v_1$. The controller 28 of the trailer backup assist system 10 may thereby estimate a hitch angle γ based on the trailer yaw rate $\omega_2$, the vehicle yaw rate $\omega_1$, and the vehicle speed $v_1$ in view of a kinematic relationship between the trailer 12 and the vehicle 14. In another embodiment, the sensor system 16 may additionally or alternatively include a hitch angle sensor 44, such as a vision-based system that employs a camera 46 on the vehicle 14 to monitor a target 52 on the trailer 12 to determine the hitch angle γ and in some embodiments further increase reliability of the overall estimated hitch angle γ.

With respect to the general operation of the trailer backup assist system 10, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller 28 may generate a steering command for the vehicle 14 to guide the trailer 12 on the desired curvature 26 based on the estimated hitch angle γ and a kinematic relationship between the trailer 12 and the vehicle 14. Therefore, the accuracy of the hitch angle estimation is critical to operating the trailer backup assist system 10. However, it is appreciated that such a system for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes both a sensor module 20 and a vision-based hitch angle sensor 44 for estimating the hitch angle γ between the vehicle 14 and the trailer 12. The illustrated hitch angle sensor 44 employs a camera 46 (e.g., video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21, in additional embodiments, may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilize processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

Figure 2:
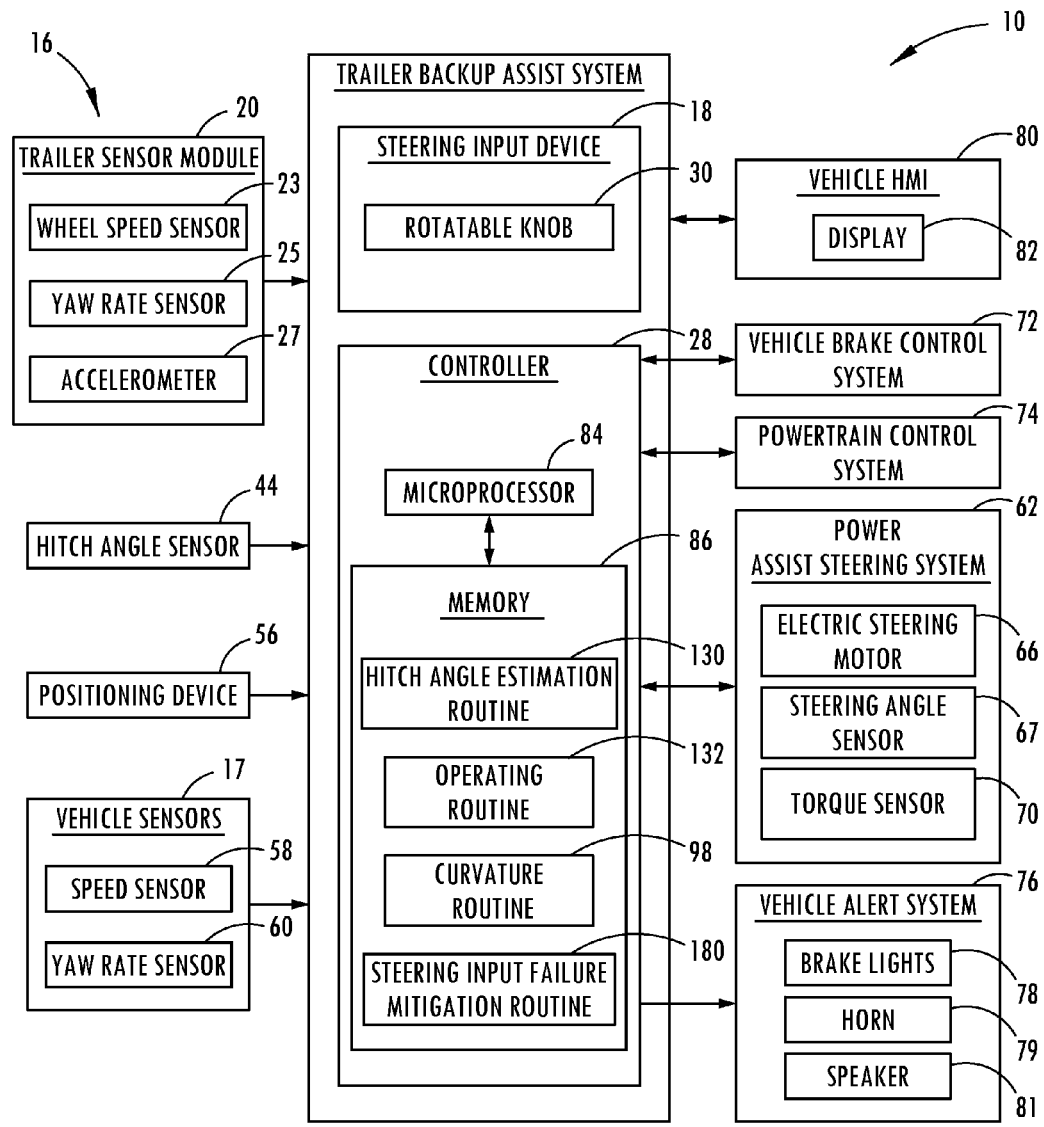
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the trailer backup assist system 10 may receive vehicle and trailer status-related information from additional sensors and devices. The additional sensors and devices may be used in lieu of the hitch angle sensor 44 or the sensor module 20 in the event that one or more sensors (e.g., hitch angle sensor 44) used for determining the hitch angle γ fail. This trailer status-related information includes positioning information from a positioning device 56, which may include a global positioning system (GPS) on the vehicle 14 or a hand held device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a vehicle yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64 via an internal torque, preventing manual intervention with the steering wheel 68 during autonomous steering. More specifically, a torque sensor 70 is provided on the power assist steering system 62 that senses torque (e.g., gripping and/or turning) on the steering wheel 68 that is not expected from autonomous control of the steering wheel 68 and therefore indicative of manual intervention by the driver. In some embodiments, external torque applied to the steering wheel 68 may serve as a signal to the controller 28 that the driver has taken manual control and for the vehicle 14 to discontinue steering maneuvers and/or alerts.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions, to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative, or in addition to, the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10, in some embodiments, may regulate speed of the vehicle 14 during backing of the trailer 12, which can reduce the potential for unacceptable trailer backup conditions. Examples of unacceptable trailer backup conditions include, but are not limited to, a vehicle 14 over-speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. Unacceptable trailer backup conditions may result from the failure of one or more sensors (e.g., hitch angle sensor 44) and/or inputs (e.g., steering input device 18) on the vehicle 14 and/or trailer 12 to provide information to the controller 28 of the trailer backup assist system 10. In such events, the driver may be unaware of the failure until the unacceptable trailer backup condition is imminent or already happening. Therefore, it is disclosed herein that the trailer backup assist system 10 can generate an alert signal corresponding to a notification of an actual, impending, and/or anticipated unacceptable trailer backup condition, and prior to driver intervention, generate a counter measure to prevent such an unacceptable trailer backup condition, as further described herein.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability, or when the failure of a sensor and/or an input device is detected. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1) capable of displaying images indicating the alert. Such an embodiment may be desirable to notify the driver of the vehicle 14 that a sensor and/or input device used by the backup assist system 10 had failed. Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display an image indicating the sensor and/or input device that has failed. In addition, the portable device may provide feedback information, such as visual, audible, and tactile alerts.

As further illustrated in FIG. 2, the trailer backup assist system 10 includes the steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. Given the importance of the steering input device 18 in controlling the vehicle 14 and trailer 12 while in motion, fault transition systems directed toward mitigating a failure of the steering input device 18 by generating a countermeasure may be a desirable feature in the trailer backup assist system 10. Accordingly, the controller 28 of the trailer backup assist system 10 may detect failure of the steering input device 18 and engage a countermeasure when the steering input device 18 fails, until the driver regains operational control of the vehicle 14.

As will be discussed below in more detail, the steering input device 18, according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all, or a portion of, the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
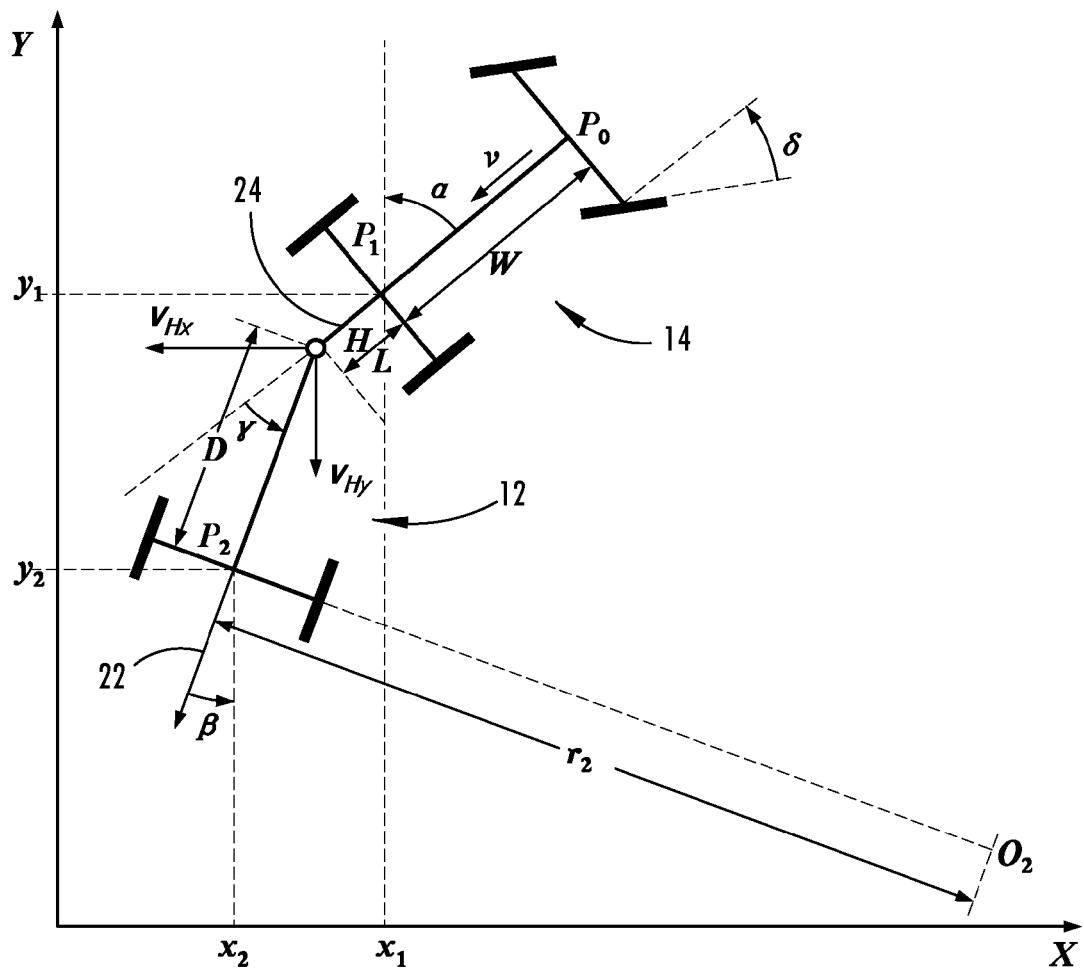
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
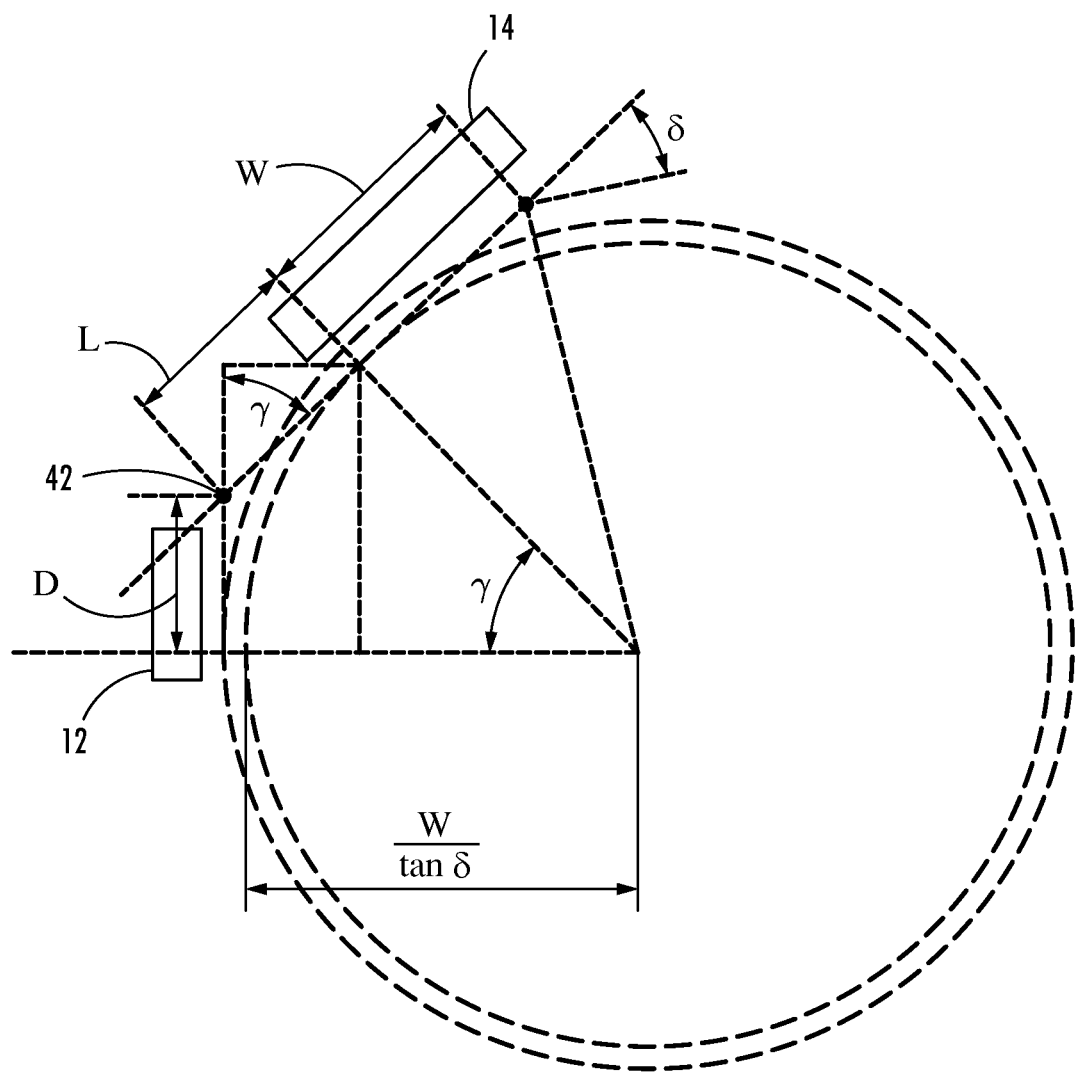
FIG. 4 is a schematic diagram showing a relationship between a hitch angle and a steering angle of the vehicle as it relates to curvature of the trailer and a jackknife angle.

Referring now to FIG. 4, in the illustrated embodiments of the disclosed subject matter, it may be desirable to limit the potential for the vehicle 14 and the trailer 12 to attain a jackknife angle (i.e., the vehicle/trailer system achieving a jackknife condition). A jackknife angle γ(j) refers to a hitch angle γ that while backing cannot be overcome by the maximum steering input for a vehicle such as, for example, the steered front wheels of the vehicle 14 being moved to a maximum steered angle δ at a maximum rate of steering angle change. The jackknife angle γ(j) is a function of a maximum wheel angle for the steered wheels of the vehicle 14, the wheel base W of the vehicle 14, the distance L between hitch point and the rear axle of the vehicle 14, and the trailer length D between the hitch point and the axle of the trailer 12 or the effective axle when the trailer 12 has multiple axles. When the hitch angle γ for the vehicle 14 and the trailer 12 achieves or exceeds the jackknife angle γ(j), the vehicle 14 may be pulled forward to reduce the hitch angle γ. Thus, for limiting the potential for a vehicle/trailer system attaining a jackknife angle, it is preferable to control the yaw angle of the trailer 12 while keeping the hitch angle γ of the vehicle/trailer system relatively small.

A kinematic model representation of the vehicle 14 and the trailer 12 can also be used to determine a jackknife angle for the vehicle-trailer combination. Accordingly, with reference to FIGS. 3 and 4, a steering angle limit for the steered front wheels requires that the hitch angle γ cannot exceed the jackknife angle γ(j), which is also referred to as a critical hitch angle γ. Thus, under the limitation that the hitch angle γ cannot exceed the jackknife angle γ(j), the jackknife angle γ(j) is the hitch angle γ that maintains a circular motion for the vehicle/trailer system when the steered wheels 64 are at a maximum steering angle δ(max). The steering angle for circular motion with hitch angle γ is defined by the following equation.

$$\tan\delta_{max} = \frac{w\sin\gamma_{max}}{D + L\cos\gamma_{max}}$$

Solving the above equation for hitch angle γ allows jackknife angle γ(j) to be determined. This solution, which is shown in the following equation, can be used in implementing trailer backup assist functionality in accordance with the disclosed subject matter for monitoring hitch angle γ in relation to jackknife angle.

$$\cos\bar{\gamma} = \frac{-b \pm \sqrt{b^2 - 4ac}}{2a}$$

where,
a=L² tan²δ(max)+W²;
b=2 LD tan²δ(max); and
c=D² tan²δ(max)−W².

In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired curvature 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature 26 of a trailer 12 or otherwise selecting a desired backing path during such trailer backup assist.

Figure 5:
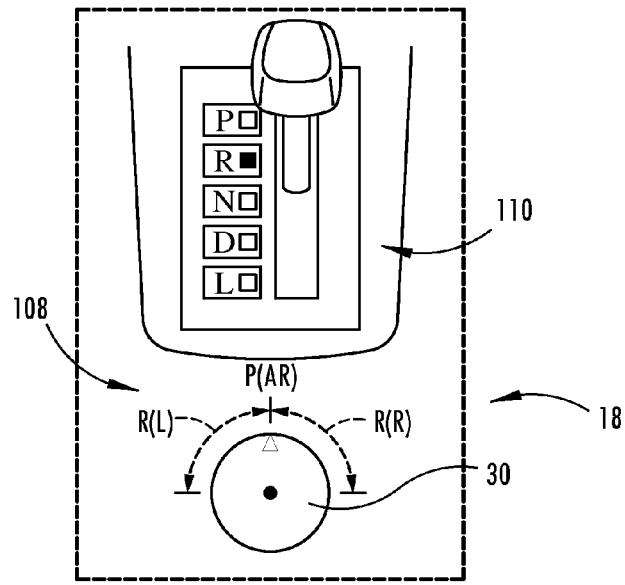
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes the rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 6:
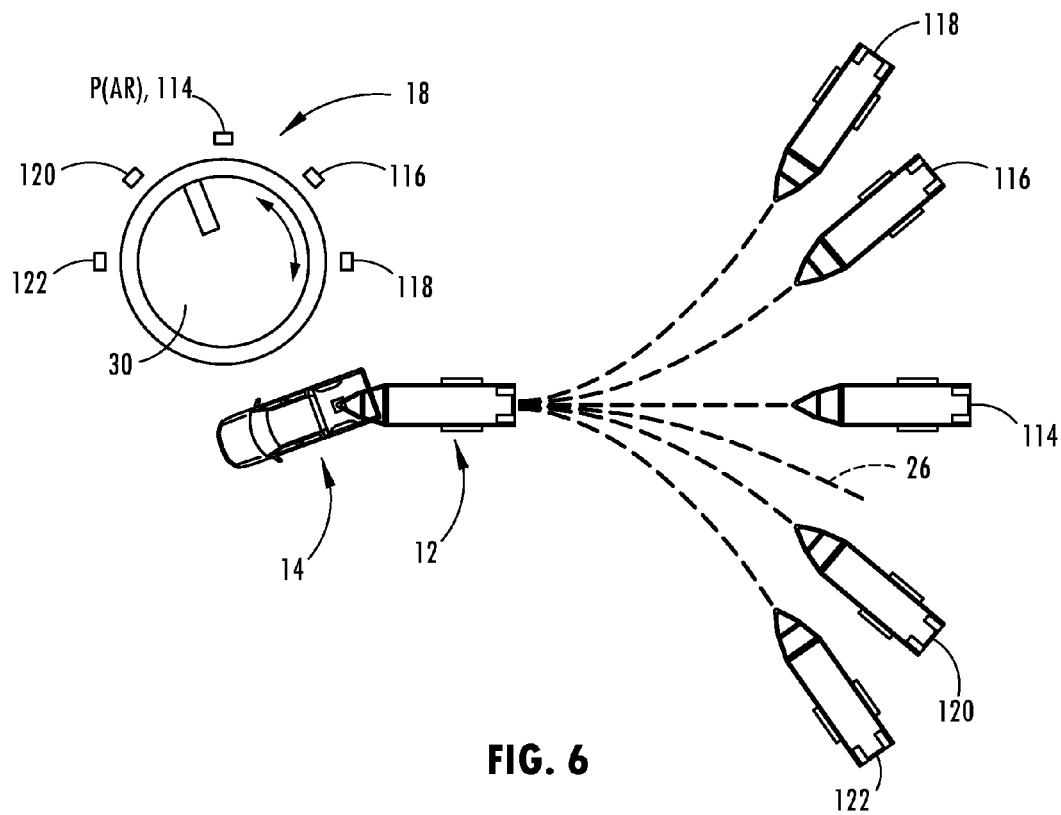
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 5-6, may be biased (e.g., by a spring return) to a center or at-rest position P(AR) 114 between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) 114 can increase (e.g., non-linearly) as a function of the amount of rotation of the rotatable knob 30 with respect to the at-rest position P(AR) 114. Additionally, the rotatable knob 30 can be configured with position indicating detents such that the driver can positively feel the at-rest position P(AR) 114 and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) 114 and a direction of movement of the rotatable knob 30 with respect to the at-rest position P(AR) 114. It is also contemplated that the rate of rotation of the rotatable knob 30 may also be used to determine the desired curvature output to the controller 28. The at-rest position P(AR) 114 of the knob corresponds to a signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 6, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 7:
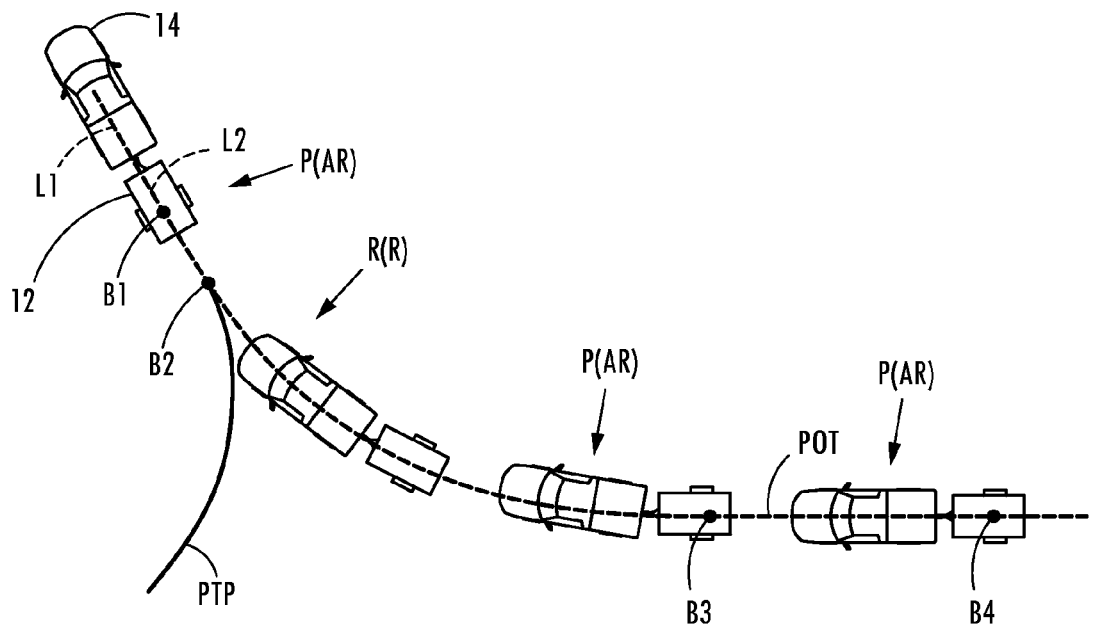
FIG. 7 is a schematic diagram showing a backup sequence of a vehicle and a trailer implementing various curvature selections with the trailer backup assist system, according to one embodiment.

Referring to FIG. 7, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 7, in order to activate the trailer backup assist system 10, the driver interacts with the trailer backup assist system 10 which automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 8:
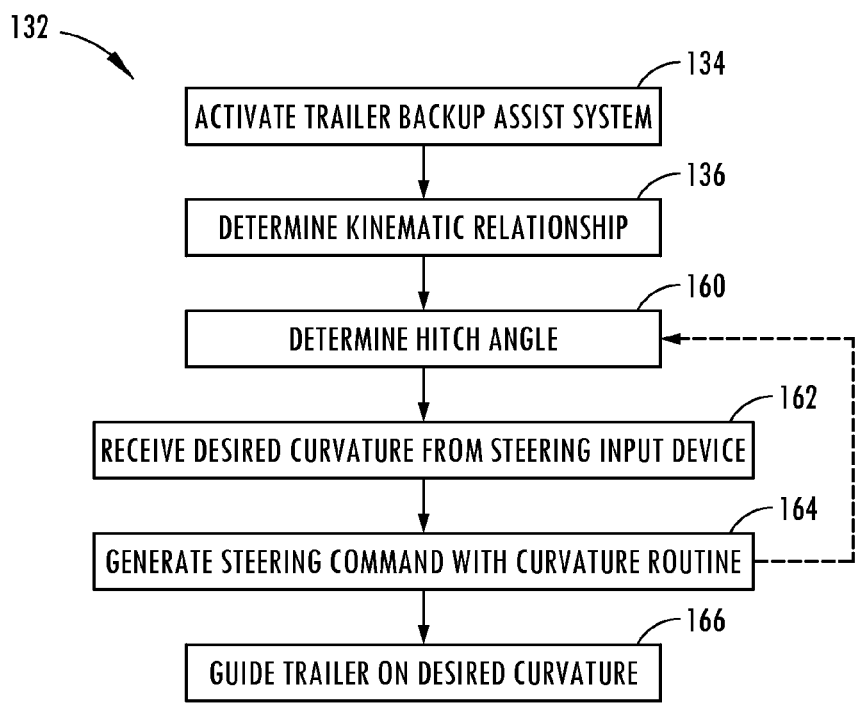
FIG. 8 is a flow diagram illustrating a method of operating a trailer backup assist system using an operating routine for steering a vehicle reversing a trailer with normalized control of the desired curvature, according to one embodiment.

With reference to FIG. 8, a method of operating one embodiment of the trailer backup assist system 10 is illustrated, shown as one embodiment of the operating routine 132 (FIG. 2). At step 134, the method is initiated by the trailer backup assist system 10 being activated. It is contemplated that this may be done in a variety of ways, such as making a selection on the display 82 of the vehicle HMI 80. The next step 136 then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3 and 4, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 160 to determine the current hitch angle by processing the hitch angle estimation routine 130.

Figure 9:
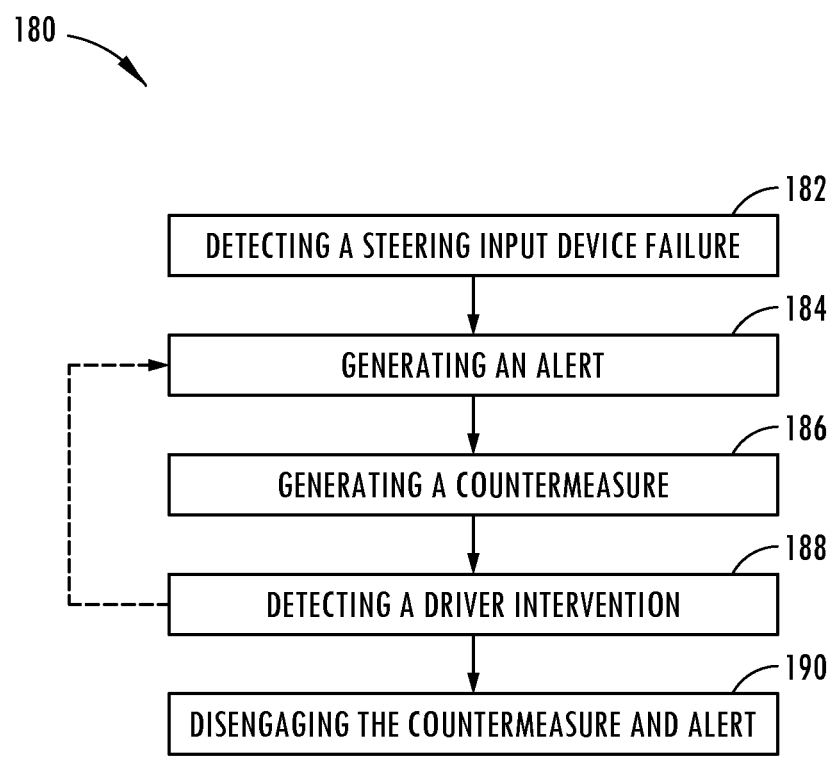
FIG. 9 is a flow diagram illustrating a method of operating a trailer backup assist system once an input device has failed, according to one embodiment.

With reference to FIG. 9, due to the automated nature of the trailer backup assist system 10, it is desirable to include fault transition systems designed to be implemented if the steering input device 18 failed during operation of the backup assist system 10. Under such a circumstance, it would be desirable for the system to alert the driver to the input failure, deploy at least one countermeasure to prevent an unacceptable trailer backup condition (e.g., a jackknife condition or an over-speed condition) from occurring before the driver is able to respond to the input failure, and end the alert and countermeasure once the driver has regained manual control of the vehicle 14.

Accordingly, one method of operating a steering input failure mitigation routine 180 is illustrated. Similar to other trailer backup assist routines, the steering input failure mitigation routine 180 may also be stored in the memory 86 of the controller 28 (FIG. 2). The steering input failure mitigation routine 180 takes place during the operating routine 132 and is activated by step 182 of detecting a steering input device failure. The failure may take place in any of the above mentioned embodiments of the steering input device 18 or combinations thereof. Once failure of the steering input device 18 (e.g., rotatable knob 30) is detected, step 184 of generating an alert is performed. The alert may be audible, visual, and/or haptic/tactile and may include any of the alerts outlined above. The alert is designed to notify the driver that the steering input device 18 has failed and that manual control of the vehicle 14 is required. After step 184 of generating an alert is performed, step 186 of generating a countermeasure is performed. It is also contemplated that step 184 of generating the alert and step 186 of generating the countermeasure may in an additional embodiment, take place simultaneously or in a reverse order from that depicted in FIG. 9 without departing from the disclosure. Step 188 of detecting a driver intervention (e.g., an external torque applied to the steering wheel 68) is then determined. If the controller 28 does not detect driver intervention, then the failure mitigation routine 180 reissues or continues step 184 of generating the alert and/or step 186 of generating the countermeasure. If driver intervention is detected in step 188, step 190 of disengaging the countermeasure and alert is performed.

Referring again to FIG. 9, step 182 of detecting an input device failure may include more than mechanical or electrical failures of the input device (e.g., rotatable knob 30). For example, input device failure may include the steering input device 18 failing to provide a desired backing path to the controller 28 after a threshold period of time, a lack of electrical power to the steering input device 18 and/or controller 28, a mechanical and/or electrical failure within the controller 28, the controller 28 being unable to recognize and/or process signals sent from the steering input device 18, wiring or transmission issues between the steering input device 18 and controller 28, as well as any other malfunctions or failures that may prevent the controller 28 from generating a steering command based on a desired backing path entered into the steering input device 18.

Still referring to FIG. 9, step 186 of generating a countermeasure may include the controller 28 generating at least one of a braking command, a powertrain command, or a steering command. In some embodiments, a combination of commands may be generated or engaged during step 186 depending on the nature of the sensor failure and the kinematic relationship between the vehicle 14 and the trailer 12. In other embodiments, the intensity, or magnitude, of the countermeasures generated may vary based on the nature of the sensor failure and the kinematic relationship between the vehicle 14 and the trailer 12. The countermeasures are configured to prevent the vehicle 14 and trailer 12 from entering an unacceptable trailer backup condition (e.g., a jackknife condition or an over-speed condition) before the driver has time to respond to the steering input device 18 failure by resuming manual control. The braking command countermeasure instructs the brake control system 72 to increase brake pressure on the vehicle 14 and/or trailer 12, thereby reducing the speed independent of the brake pedal position. Countermeasures utilizing the powertrain command instruct the powertrain control system 74 to reduce the output of the vehicle's 14 powertrain, thereby slowing the vehicle 14, independent of the accelerator pedal position. A steering command countermeasure may be generated which instructs the steering control system to steer the vehicle 14 and trailer 12 toward a zero degree hitch angle $\gamma$, thereby minimizing the chance of an unacceptable trailer backup condition occurring prior to the driver resuming manual control.

With further reference to FIG. 9, the driver intervention of step 188 may include a variety of actions signaling to the controller 28 that the driver has resumed manual control of the vehicle 14. For example, in one embodiment the controller 28 may be configured to detect an external torque applied to the torque sensor 70 of the steering wheel 68. External torque on the steering wheel 68 may be indicative of the driver grabbing and/or rotating the wheel 68 to resume manual control. In another embodiment, the controller 28 may be configured to respond to the depression of the brake pedal of the vehicle 14. The activation of the brake pedal is indicative of the driver being aware of the alert and intervening to resume manual control of the vehicle 14. In yet other embodiments, step 188 of detecting driver intervention may be satisfied by the driver acknowledging the alert through a voice confirmation, an interactive button on the human machine interface 80, as well as other conceivable methods of the driver communicating awareness of the alert to the controller 28.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A trailer backup assist system, comprising:
 a sensor measuring a hitch angle between a vehicle and a trailer;
 a steering input device providing a desired backing path of the trailer; and
 a controller generating a steering command for the vehicle based on the desired backing path and the hitch angle and generating a countermeasure for operating the vehicle when the steering input device fails to operate.

2. The trailer backup assist system of claim 1, wherein the steering input device is operable between a plurality of selections that each define the desired backing path of the trailer, wherein the desired backing path is defined by a curvature of the trailer.

3. The trailer backup assist system of claim 1, wherein the countermeasure includes at least one of a braking command, a powertrain command, and a steering command.

4. The trailer backup assist system of claim 1, further comprising:
 a steering wheel of the vehicle for commanding a steering angle of the vehicle, wherein the controller disengages the countermeasure when an external torque is applied to the steering wheel.

5. The trailer backup assist system of claim 3, wherein a steering wheel includes a torque sensor for sensing an internal torque applied by a power assist steering system and an external torque applied by a driver of the vehicle.

6. The trailer backup assist system of claim 1, wherein the countermeasure is configured to prevent a jackknife condition.

7. The trailer backup assist system of claim 1, wherein the steering input device includes a rotatable knob having a first position providing a substantially straight backing path as defined by the trailer, and a plurality of rotated positions on opposing sides of the first position providing curved backing paths with varying degrees of curvature.

8. An input failure mitigation system for a vehicle reversing a trailer, comprising:
 a steering input module providing a desired backing path of the trailer; and
 a controller detecting failure of the steering input module to provide the desired backing path, engaging a countermeasure when the steering input module fails to operate, and disengaging the countermeasure upon a driver intervention to operate the vehicle.

9. The input failure mitigation system of claim 8, wherein the controller generates a steering command for the vehicle to guide the trailer along the backing path based on a sensed hitch angle and a kinematic relationship between the vehicle and the trailer.

10. The input failure mitigation system of claim 8, further comprising:
 a steering wheel for directly controlling a steering angle of the vehicle, wherein the controller disengages the countermeasure when an external torque is sensed on the steering wheel.

11. The input failure mitigation system of claim 10, wherein the steering wheel includes a torque sensor for sensing an internal torque applied by a steering system of the vehicle and the external torque applied by a driver of the vehicle for manually steering the vehicle.

12. The input failure mitigation system of claim 8, wherein the steering input module includes a rotatable knob configured to provide a curvature of the trailer, defining the desired backing path.

13. The input failure mitigation system of claim 8, wherein the countermeasure includes at least one of a braking command, a powertrain command, and a steering command, and wherein the countermeasure is configured to prevent a jackknife condition.

14. The input failure mitigation system of claim 8, wherein the driver intervention includes at least one of sensing an external steering torque on a steering wheel and sensing a braking command.

15. The input failure mitigation system of claim 14, further comprising:
 a brake control system of the vehicle that senses when a brake pedal is depressed to define the braking command.

16. A method for mitigating input failure of a trailer backup assist system, comprising;
 providing a desired backing path of a trailer reversed by a vehicle;
 generating a steering command for the vehicle based on the desired backing path;
 generating a countermeasure command for the vehicle when the desired backing path fails to operate; and
 disengaging the countermeasure command upon a driver intervention.

17. The method of claim 16, wherein the driver intervention includes at least one of sensing an external steering torque on a steering wheel and sensing a braking command on a brake pedal.

18. The method of claim 16, further comprising:
 sensing a hitch angle between the vehicle and the trailer, wherein the steering command is generated based on the desired backing path, the hitch angle, and a kinematic relationship between the vehicle and the trailer.

19. The method of claim 16, wherein the desired backing path is provided using a steering input device that includes a rotatable knob configured to provide a curvature of the trailer.

20. The method of claim 16, wherein the countermeasure includes at least one of a braking command, a powertrain command, and a steering command.

\* \* \* \* \*